Nov. 2, 1948.    G. F. LOMELINO    2,453,024
COUPLING
Filed April 24, 1946
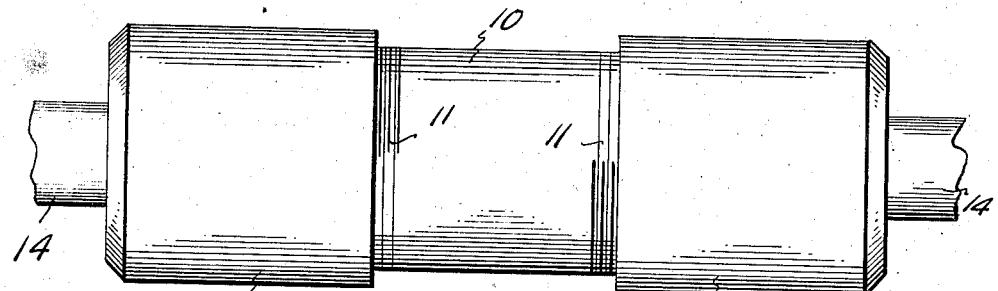
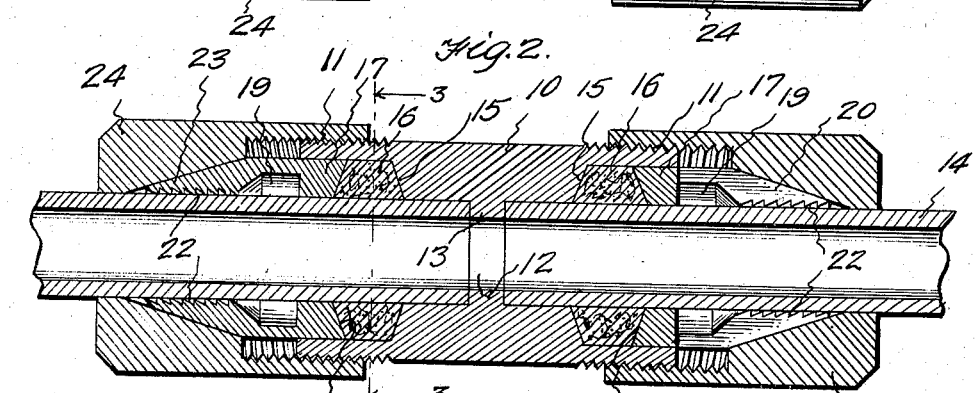
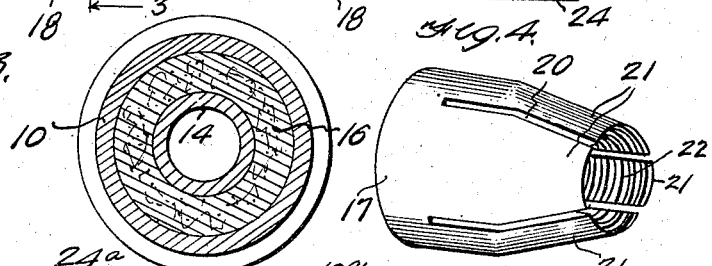
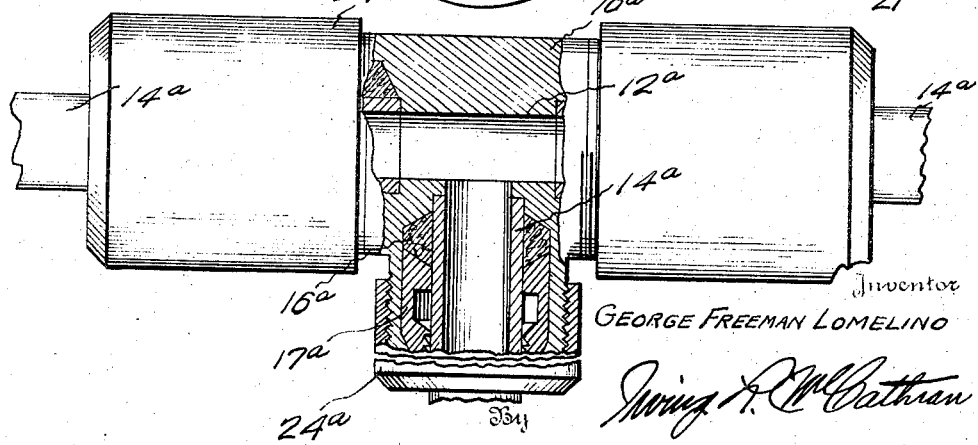
Inventor
GEORGE FREEMAN LOMELINO
By
Attorney Patented Nov. 2, 1948

2,453,024

UNITED STATES PATENT OFFICE 2,453,024

COUPLING

George Freeman Lomelino, Olney, Ill., assignor of one-half to Lawrence E. Ostrom, Olney, Ill.

Application April 24, 1946, Serial No. 664,511

1 Claim. (Cl. 285—123)

This invention relates to couplings, and the like, and has for one of its objects the production of a simple and efficient means for quickly and securely coupling sections of pipe, tubular material, or shafting, together.

A further object of this invention is the production of a coupling which will completely seal the coupled sections together in a manner to prevent slipping or accidental disconnection of the coupled sections of pipe, shafting, or other tubular material.

Other objects and advantages of this invention will appear throughout the following specification and claim.

In the drawing:

Figure 1 is a side elevational view of the coupling;

Figure 2 is a longitudinal sectional view;

Figure 3 is a transverse sectional view taken on line 3—3 of Figure 2;

Figure 4 is a perspective view of the gripping thimble;

Figure 5 is a modified form of the coupling illustrating a coupling such as a T-connection.

By referring to the drawing, it will be seen that 10 designates the body of the coupling of any suitable exterior contour, which body is provided with oppositely threaded ends 11. The body 10 is also provided with a central bore 12 and may be provided, if desired, with an integral central abutment collar 13 against which the pipe or other sections 14 to be joined, abut. The body 10 is provided with inset inclined packing ring abutment walls 15 near the opposite ends of the body and a suitable packing ring 16 is placed in abutting relation with each wall 15. These packing rings are readily compressible and are necessarily impervious to destructive action of fluid, steam, or gas, to which they may be exposed. These packing rings are of the conventional transverse contour to create an inward and downward pressure of the packing against the elements engaged to provide an efficient leak-proof seal therearound.

A gripping thimble 17 is fitted in each open end of the body 10 and is provided with a beveled inner face 18 which abuts against the adjoining packing ring 16. The thimble 17 is provided with a cut-away cavity 19 adjacent the inner end thereof and is also provided with longitudinally extending slots 20 thereby defining a plurality of spring-gripping jaws 21 which are preferably four in number. The thimble tapers toward its outer end to define a substantially cone-like formation, as shown in Figures 2 and 4. The spring-gripping jaws 21 are provided with teeth projections 22 or circumferential grooves upon their inner faces which are preferably cut to resist outward pull upon the pipes 14 and prevent accidental dislocation of the joined parts. The outer face of each thimble 17 is smooth and is adapted to be engaged by the tapering wall 23 of the clamping sleeve or nut 24, which may be of any suitable exterior contour. A sleeve 24 is threaded upon each end of the body 10, as shown.

It should be understood that the clamping sleeves or nuts 24, when threaded upon the body 10, will first compress the packing rings 16 to a complete sealing position, and as these sleeves or nuts 24 are further threaded upon the body 10, the teeth 22 will bite into the pipes or elements 14 and firmly secure the parts in place against accidental removal. This action is due to the wedging pressure of the inclined walls 23 upon the spring tapering jaws 21 of the thimbles 17 and the abutment of the inner ends of the thimbles against the compressed sealing or packing rings 16. In this way a completely sealed non-slipping coupling joint is provided for connecting sections of pipe and the like together in a simple and efficient manner. It is obvious, however, that the extent of the seal is dependent upon the amount of pressure placed upon the sealing or packing rings 16 by forcing the thimbles 17 against the rings 16, as the sleeves or nuts 24 are threaded upon the body 10.

It should be further understood that the gripping action of the teeth 22 upon the pipe 14 is sufficiently delayed to produce a pack-off before the teeth 22 become embedded into the pipes or other elements 14. As the sleeves or nuts 24 are further threaded upon the body 10, the teeth 22 become more deeply embedded and provide a more definite grip upon the pipes or elements 14.

As shown in Figure 5, the structure shown in Figures 1 to 4, may be adapted to a T-joint. using the same structural elements which are indicated by the same numerals with the co-efficient "a" added thereto. It should be understood that the same structure may be incorporated in fittings of various types such as T's, L's, nipples of all types and other items used to produce joints. It should be further understood that certain detail changes in the detail structure may be made without departing from the spirit of the invention, so long as these changes fall within the scope of the appended claim.

Having described the invention, what is claimed is:

A coupling of the class described comprising a body having a bore to receive a connecting element, said body having a packing receiving recess, a compressible packing fitted in said recess, a thimble slidably engaging the packing and having a thickened packing engaging end for compressing the packing and sealing the areas around said element, said thimble having a split tapering opposite end defining a plurality of gripping jaws, said thimble also having a cut-away cavity in its inner face intermediate the gripping jaws and the thickened packing engaging end to provide relatively thin spring-like connecting portions between the thickened end and the gripping jaws, the split defining the jaws extending from the outer end of the jaws across the cut-away cavity to the thickened end, a wedging element surrounding the thimble and engaging the tapering jaws for clamping the jaws in locked engagement with a connecting element to be received by said body, and gripping teeth formed upon the inner face of said jaws for biting into the connecting element, the inner faces of the spring-like connecting portions being spaced radially from the connecting element which is to be received by said body.

GEORGE FREEMAN LOMELINO.

REFERENCES CITED

The following references are of record in the file of this patent:

UNITED STATES PATENTS

| Number | Name | Date |
|---|---|---|
| 1,030,237 | Hall | June 18, 1912 |
| 1,381,931 | Ostrander | June 21, 1921 |

FOREIGN PATENTS

| Number | Country | Date |
|---|---|---|
| 17,848 | Great Britain | Sept. 24, 1895 |